US008675598B2

(12) United States Patent
Huang

(10) Patent No.: US 8,675,598 B2
(45) Date of Patent: Mar. 18, 2014

(54) METHOD FOR IMPROVING THE SUCCESS RATE OF RECEPTION OF CONTROL CHANNELS IN AN LTE SYSTEM

(75) Inventor: Anpeng Huang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 301 days.

(21) Appl. No.: 13/322,285

(22) PCT Filed: Jun. 9, 2011

(86) PCT No.: PCT/CN2011/075511
§ 371 (c)(1),
(2), (4) Date: Nov. 23, 2011

(87) PCT Pub. No.: WO2012/167433
PCT Pub. Date: Dec. 13, 2012

(65) Prior Publication Data
US 2012/0314686 A1    Dec. 13, 2012

(51) Int. Cl.
*H04W 16/00* (2009.01)
(52) U.S. Cl.
USPC .......................................... 370/330; 455/446
(58) Field of Classification Search
None
See application file for complete search history.

(56) References Cited

U.S. PATENT DOCUMENTS

| 8,526,385 | B2 * | 9/2013 | Berggren et al. | 370/329 |
| 2010/0020674 | A1 * | 1/2010 | Choi et al. | 370/208 |
| 2010/0291934 | A1 * | 11/2010 | Lopes | 455/446 |
| 2011/0045836 | A1 * | 2/2011 | Hamalainen et al. | 455/446 |
| 2011/0190000 | A1 * | 8/2011 | Kwun | 455/450 |
| 2011/0201345 | A1 * | 8/2011 | Han et al. | 455/450 |
| 2012/0231805 | A1 * | 9/2012 | Wang et al. | 455/452.1 |
| 2013/0100902 | A1 * | 4/2013 | Chang et al. | 370/329 |

FOREIGN PATENT DOCUMENTS

| CN | 101772097 A | 7/2010 |
| CN | 102075947 A | 5/2011 |
| WO | 2009/099813 A1 | 8/2009 |
| WO | 2011/019518 A1 | 2/2011 |

OTHER PUBLICATIONS

Liu, J et al., 'Design and Analysis of LTE Physical Downlink Control Channel,' IEEE 69th Vehicular Technology Conference, Apr. 2009.
3GPP TS 36.211, 'Physical Channels and Modulation,' 3rd Generation Partnership Project; Technical Specification Group Radio Access Network, Evolved Universal Terrestrial Radio Access (E-UTRA), 2011, 3GPP Organizational Partners, Valbonne-France.

(Continued)

*Primary Examiner* — Min Jung
(74) *Attorney, Agent, or Firm* — Maschoff Brennan

(57) ABSTRACT

In some examples, a method for allocating a Cell Identity (CELL-ID) to a particular cell in a radio communication network is described. The method may include assigning a first Cell Identity $(CELL\text{-}ID)_i$ to a first cell i in a radio communication network. The method also includes determining an element $\delta_m$ of an aggregate $\delta_n$ which makes a sum of conflict probability in a common search space of the first cell i and in a common search space of one or more adjacent cells k have a minimum value $P_{min}$. $\delta_m$ may be an integer. The method may also include assigning a second Cell Identity $(CELL\text{-}ID)_j$ to a particular adjacent cell j selected from the one or more adjacent cells k such that an absolute value of $(CELL\text{-}ID)_i - (CELL\text{-}ID)_j$ equals $\delta_m$.

20 Claims, 10 Drawing Sheets

(56) References Cited

OTHER PUBLICATIONS

3GPP TS 36.212, 'Multiplexing and Channel Coding' 3rd Generation Partnership Project; Technical Specification Group Radio Access Network, Evolved Universal Terrestrial Radio Access (E-UTRA), 2011, 3GPP Organizational Partners, Valbonne-France.

3GPP TS 36.213, 'Physical Layer Procedures' 3rd Generation Partnership Project; Technical Specification Group Radio Access Network, Evolved Universal Terrestrial Radio Access (E-UTRA), 2011, 3GPP Organizational Partners, Valbonne-France.

International Search Report dated Oct. 13, 2011 as received in related application No. PCT/CN2011/075511.

* cited by examiner

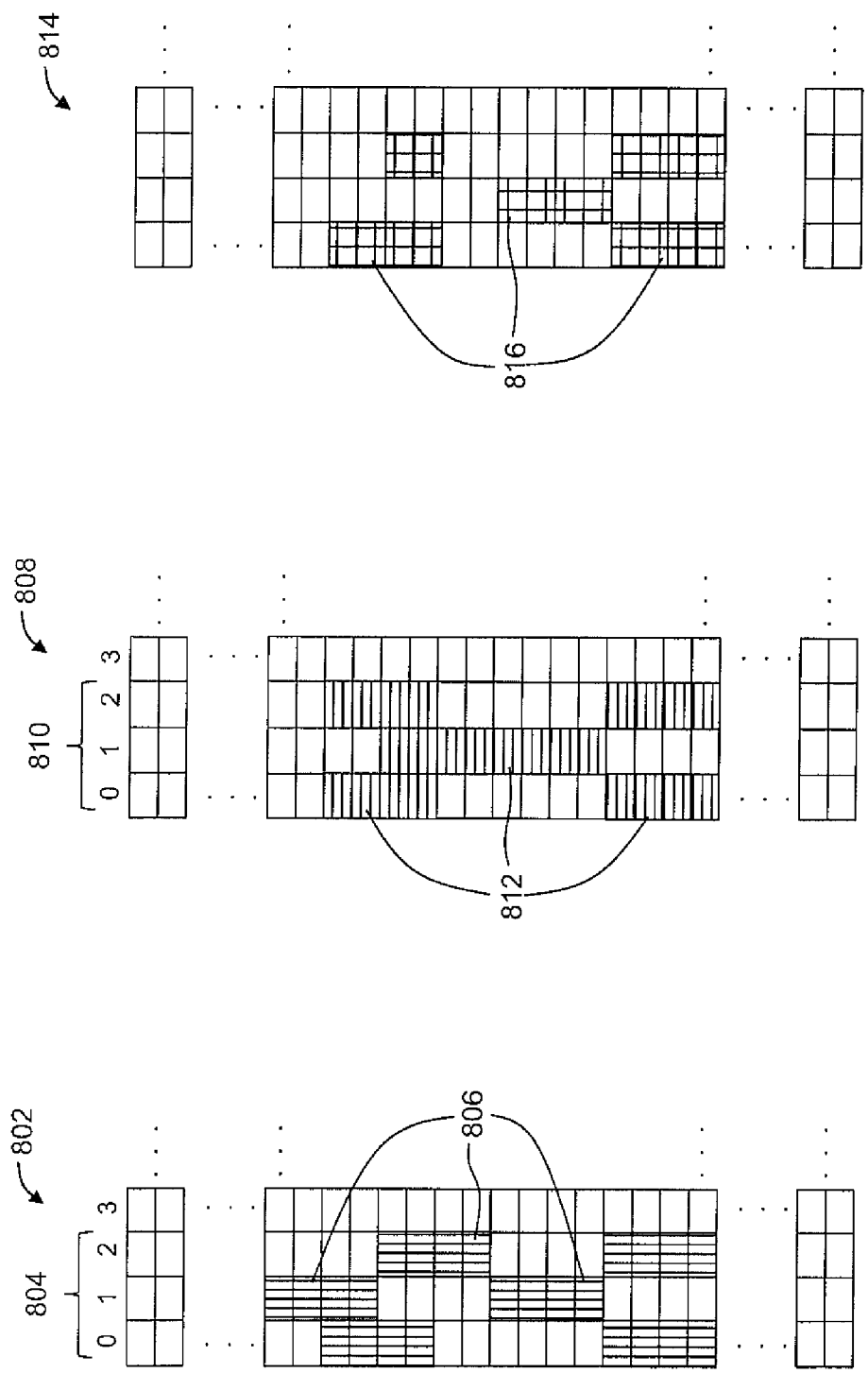

METHOD FOR IMPROVING THE SUCCESS RATE OF RECEPTION OF CONTROL CHANNELS IN AN LTE SYSTEM

BACKGROUND

Unless otherwise indicated herein, the materials described herein are not prior art to the claims in the present application and are not admitted to be prior art by inclusion in this section.

At present, base stations in some radio communication systems typically transmit scheduling information on a Physical Downlink Control Channel (PDCCH) to User Equipment (UE) within cells serviced by the respective base stations. The PDCCH may be divided into a common search space and one or more specific search spaces. The PDCCH in the common search space may be transmitted with a relatively large transmitting power to ensure coverage of the common search space of the PDCCH for a given cell near the periphery of the cell. Due to the relatively large transmitting powers used to ensure coverage near cell peripheries, PDCCHs in the common search space of adjacent cells can interfere if the PDCCHs include overlapping time-frequency resources.

PDCCH resources may be mapped to time-frequency resource locations using a sub-block interleaving method to combat fast fading of wireless channels. However, the sub-block interleaving method does not address interference problems that can arise when PDCCHs in adjacent cells include overlapping time-frequency resources.

SUMMARY

Techniques described herein generally relate to allocating CELL-IDs to cells in a radio communication system.

In some examples, a method for allocating a Cell Identity (CELL-ID) to a particular cell in a radio communication network is described. The method may include assigning a first Cell Identity $(CELL\text{-}ID)_i$ to a first cell i in a radio communication network. The method may also include determining an element $\delta_m$ of an aggregate $\delta_n$ which makes a sum of conflict probability in a common search space of the first cell i and in a common search space of one or more adjacent cells k have a minimum value $P_{min}$. $\delta_m$ may be an integer. The method may also include assigning a second Cell Identity $(CELL\text{-}ID)_j$ to a particular adjacent cell j selected from the one or more adjacent cells k such that an absolute value of $(CELL\text{-}ID)_i - (CELL\text{-}ID)_j$ equals $\delta_m$.

In some examples, a computer-readable storage medium having computer-executable instructions stored thereon that are executable by a computing device to perform operations is described. The operations may include assigning a first Cell Identity $(CELL\text{-}ID)_i$ to a first cell i in a radio communication network. The operations may also include determining an element $\delta_m$ of an aggregate $\delta_n$ which makes a sum of conflict probability in a common search space of the first cell i and in a common search space of one or more adjacent cells k have a minimum value $P_{min}$. $\delta_m$ may be an integer. The operations may also include assigning a second Cell Identity $(CELL\text{-}ID)_j$ to a particular adjacent cell j selected from the one or more adjacent cells k such that an absolute value of $(CELL\text{-}ID)_i - (CELL\ ID)_j$ equals $\delta_m$.

In some examples, a method for allocating Cell Identities (CELL-IDs) to cells in a radio communication network is described. The method may include assigning a first Cell Identity $(CELL\text{-}ID)_i$ to a first cell i in a radio communication network. The method may also include determining, for each element of an aggregate $\delta_n$, a sum of conflict probability in a common search space of the first cell i and in a common search space of one or more adjacent cells k that are adjacent to the first cell i, to generate a multiple number of conflict probability values $P_1, \ldots, P_n$. The method may also include identifying a minimum conflict probability value $P_{min}$ from the multiple number of conflict probability values $P_1, \ldots, P_n$. $P_{min}$ may correspond to an element of the aggregate $\delta_n$. The method may also include assigning a second Cell Identity $(CELL\text{-}ID)_j$ a particular adjacent cell j selected from the one or more adjacent cells k such that an absolute value of $(CELL\text{-}ID)_i - (CELL\text{-}ID)_j$ equals $\delta_m$.

In some examples, a computer-readable storage medium having computer-executable instructions stored thereon that are executable by a computing device to perform operations for allocating CELL-IDs to cells in a radio communication network is described. The operations may include assigning a first Cell Identity $(CELL\text{-}ID)_i$ to a first cell i in a radio communication network. The operations may also include determining, for each element of an aggregate $\delta_n$, a sum of conflict probability in a common search space of the first cell i and in a common search space of one or more adjacent cells k that are adjacent to the first cell i, to generate a multiple number of conflict probability values $P_1, \ldots, P_n$. The operations may also include identifying a minimum conflict probability value $P_{min}$ from the multiple number of conflict probability values $P_1, \ldots, P_n$. $P_{min}$ may correspond to an element $\delta_m$ of the aggregate $\delta_n$. The operations may also include assigning a second Cell Identity $(CELL\text{-}ID)_j$ to a particular adjacent cell j selected from the one or more adjacent cells k such that an absolute value of $(CELL\text{-}ID)_i - (CELL\text{-}ID)_j$ equals $\delta_m$.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the drawings:

FIG. 8 schematically depicts an example of PDCCHs in the common search space of each of two adjacent cells with overlapping time-frequency resources;

DETAILED DESCRIPTION

Figure 1:
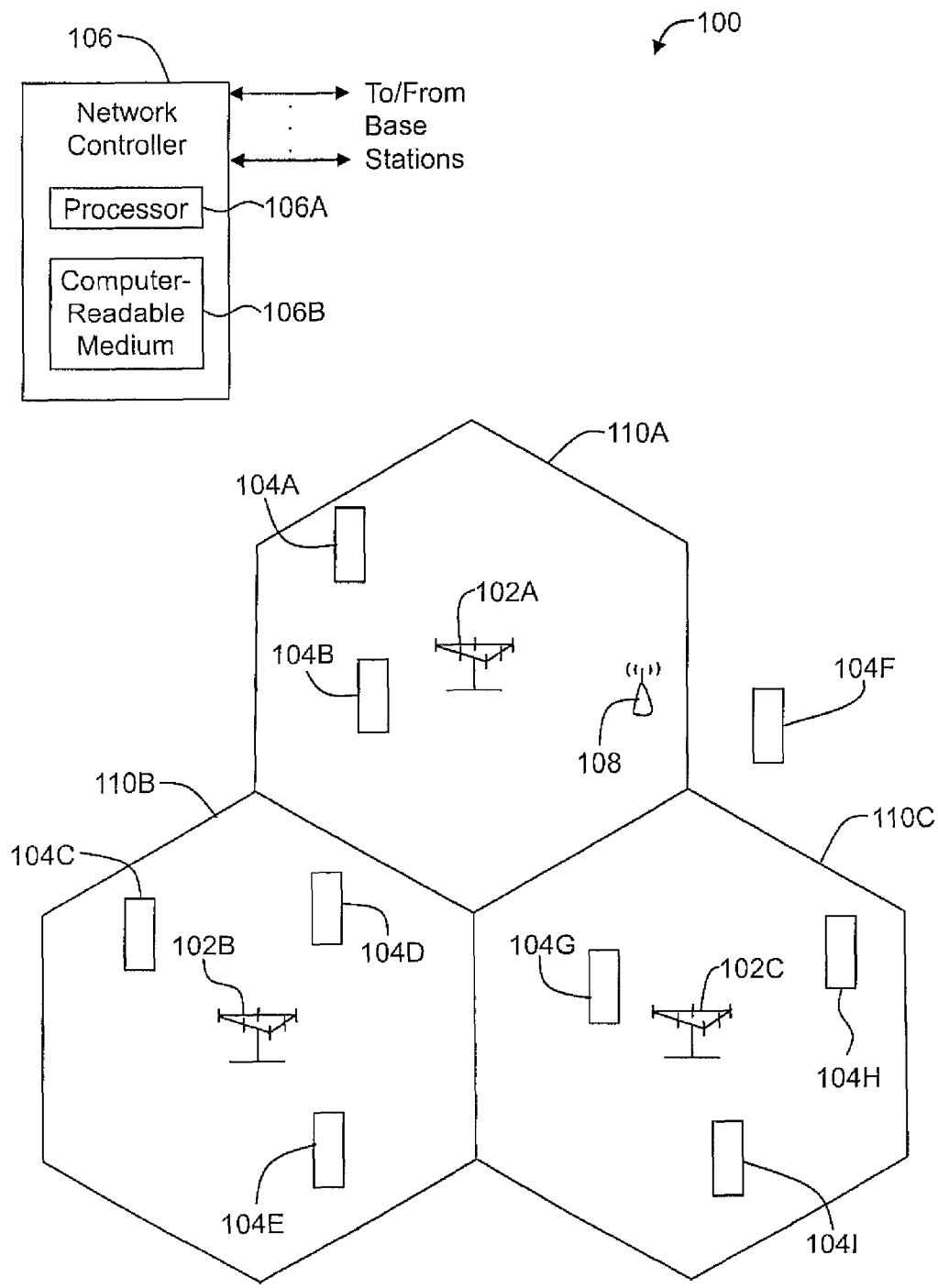
FIG. 1 is a diagram of a radio communication system including one or more base stations and one or more UEs.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein generally relate to allocating CELL-IDs to cells in a radio communication system, such as an LTE system including multiple cells. Generally, for example, CELL-IDs of cells in a radio communication network are assigned such that the common search space of PDCCHs in adjacent cells can be interleaved with a maximum probability at the time-frequency location to avoid strong mutual interference between the common search spaces of the PDCCHs.

In some embodiments, the specific time-frequency resource location to which the PDCCH in the common search space of a cell is mapped depends on the CELL-ID of the base station from which the PDCCH in the common search space originates, as defined by a particular standard such as the 3GPP LTE standard. Accordingly, overlap in the time-frequency resource locations of adjacent cells can be reduced by assigning CELL-IDs in way which makes a sum of conflict probability in a common search space of one cell and in a common search space of one or more adjacent cells have a minimum value $P_{min}$.

The techniques described herein may be used for various radio communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM(R), etc. UTRA and E-UTRA are part of Universal Mobile Telecommunication System (UMTS).

3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). Certain embodiments are described below for LTE, and LTE terminology may be used below. However, the principles of the disclosed embodiments are not limited to LTE networks.

FIG. 1 is a diagram of a radio communication system 100 including one or more base stations 102A-102C (collectively "base stations 102") and one or more user equipment (UE) 104A-104I (collectively "UEs 104"), arranged in accordance with at least some embodiments described herein. Optionally, the radio communication system 100 may further include a network controller 106 one or more relay nodes 108.

Each of the base stations 102 may include, but is not limited to, a base transceiver station (BST), a Node B (NB), an evolved Node B (eNB), or the like or any combination thereof In the illustrated embodiment, each of the base stations 102 is implemented as a macro base station in a respective cell 110A-110C (collectively "cells 110") and may be configured to service UEs 104 within the respective cell 110. While not shown for simplicity, the cells 110 may overlap at the edges and/or may have different shapes than the generally hexagonal shapes shown in FIG. 1.

The UEs 104 are generally configured to wirelessly communicate with the base stations 102 and/or relay node 108 and may alternately or additionally be referred to as terminals, access terminals (ATs), mobile stations (MS), subscriber units, or the like. In some embodiments, each UE 104 may include, but is not limited to, a mobile phone, a smartphone, a laptop computer, or the like or any combination thereof.

The network controller 106 may be communicatively coupled to the base stations 102 and may be configured to provide coordination and control for the base stations 102. The network controller 106 may be a single network entity or a collection of network entities. Alternately or additionally, the network controller 106 may be configured to assign a Cell Identity ("CELL-ID") to each of the cells 110, and more particularly to each of the base stations 102, as described in greater detail below. In these and other embodiments, the network controller 106 may include a processor 106A or other computing device communicatively coupled to a computer-readable medium 106B.

The processor 106A may be configured to execute computer-executable instructions stored on the computer-readable medium 106B that are effective to cause the network controller 106 to perform one or more of the operations described herein, such as one or more of the operations described with respect to FIGS. 10-11 below.

The computer-readable medium 106B may store computer-executable instructions such as program code, as well as data, and/or other information used by the processor 106A or other components of the network controller 106. The computer-readable medium 106B may include a non-transitory computer-readable medium such as, but not limited to, RAM, ROM, EEPROM, CD-ROM or other optical disk storage, magnetic disk storage or other magnetic storage devices, or NAND-based flash memory or other solid state storage. More generally, the computer-readable medium 106B may include any non-transitory computer-readable medium which can be used to carry or store desired program code means in the form of computer-executable instructions or data structures and which can be accessed by a computing device such as the processor 106A.

In general, the relay node 108 may be configured to receive a transmission of data from an upstream station, e.g., from the base station 102A, and to send a transmission of data to a downstream station, e.g., to the UE 104F.

In some embodiments, user traffic data, system information and system high layer signaling are all transmitted on shared channels. In particular, all UEs 104 within a given cell 110 may share system resources in a manner that at each scheduling time, the corresponding base station 102 allocates the shared resources to the UEs 104 within the corresponding cell 110. After completing a shared resource allocation strategy, a base station 102 may transmit relevant scheduling information on a Physical Downlink Control Channel (PDCCH) to scheduled UEs 104. The scheduling information may include, but is not limited to, a location of frequency resources for the scheduled UEs 104, size of allocated resource blocks, adopted modulation and coding modes, and the like or any combination thereof.

After a UE 104 receives the PDCCH and correctly decodes scheduling information loaded on the PDCCH, the UE 104 may be able to receive user traffic data on a downlink traffic channel, or send uplink traffic data on an uplink shared traffic channel. If the UE 104 cannot correctly receive the scheduling information on the PDCCH, the UE 104 may not be able to receive or send user traffic data on the corresponding traffic channel. Thus, if the performance of the PDCCH cannot be guaranteed, system resources may be wasted and/or Quality of Service (QoS) for users of UEs 104 may be unsatisfactory.

The PDCCH may be divided into a common search space for all UEs within a cell 110A, 110B or 110C and one or more specific search space(s) for corresponding UEs 104 within the cell 110A, 110B or 110C, System Information Block (SIB), paging information and/or other scheduling information may be transmitted in the common search space, while traffic data of a corresponding one of the UEs 104 may be transmitted in a corresponding specific search space.

To ensure coverage of the common search space of the PDCCH within a given one of cells 110, such as near the peripheries of the cells 110, the PDCCH at least in the common search space may be transmitted with a relatively large transmitting power in each of cells 110. However, if PDCCHs in the common search space in one or more adjacent cells 110 are at the same time-frequency resources, the PDCCHs in the common search space may interfere near the peripheries of the cells 110 and/or at other locations, thereby significantly reducing the reception performance of the PDCCH in the common search space so that UEs 104 in the periphery of the cells 110 cannot correctly decode the scheduling information on the PDCCH in the common search space.

Accordingly, some embodiments described herein relate to allocating CELL-IDs to each of the cells 110, and more particularly to each of the base stations 102, such that the common search space of PDCCHs in adjacent cells 110 can be interleaved with a maximum probability at a time-frequency location to substantially reduce and/or eliminate mutual interference between the common search spaces of the PDCCHs in the adjacent cells 110. Prior to describing these and other embodiments in more detail, an example base station and UE will first be described with respect to FIG. 2, and various aspects of the LTE radio technology will then be described with respect to FIGS. 3-9. Various example methods relating to allocating CELL-IDs will then be described with respect to FIGS. 10-11.

Figure 2:
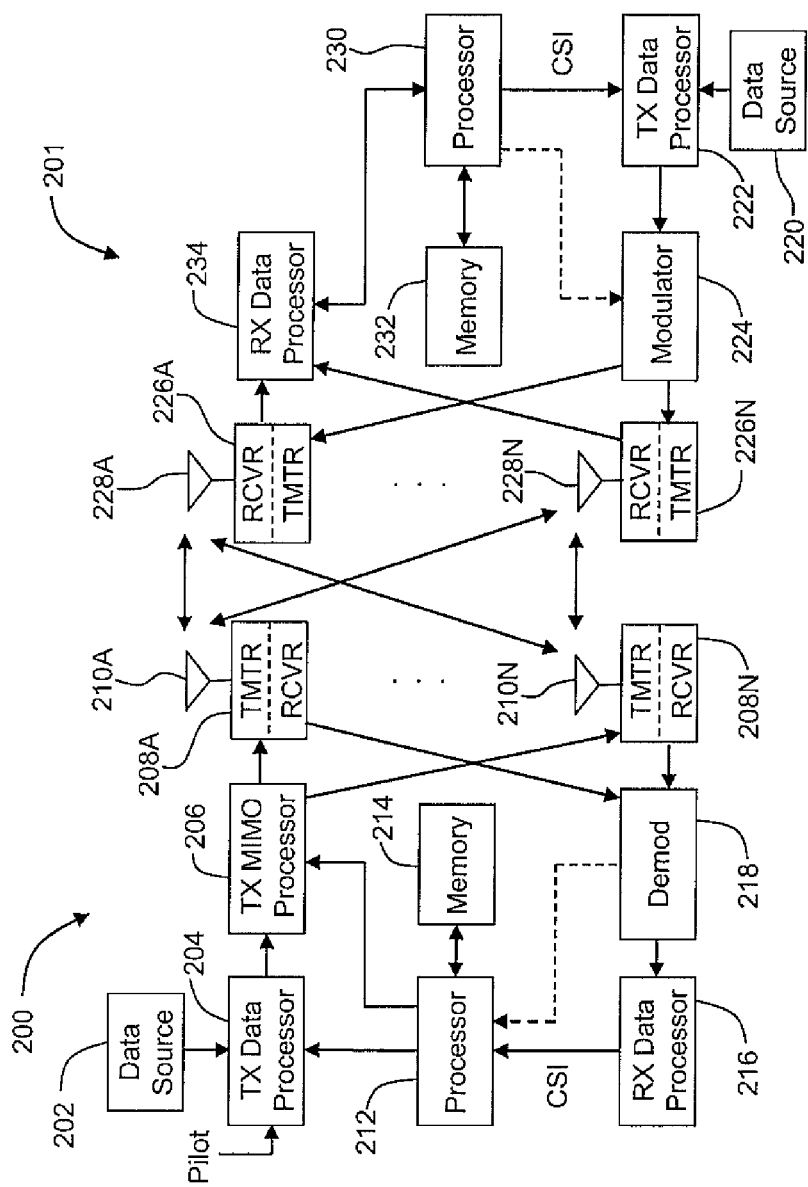
FIG. 2 is a block diagram of an example base station and UE.

FIG. 2 is a block diagram of an example base station 200 and UE 201, arranged in accordance with at least some embodiments described herein. The base station 200 of FIG. 2 may correspond to any one of the base stations 102 of FIG. 1. Alternately or additionally, the UE 201 may correspond to any one of the UEs 104 of FIG. 1.

In the illustrated embodiment, the base station 200 may include, for example, a data source 202, a transmit (TX) data processor 204, a TX multiple input multiple output (MIMO) processor 206, one or more transceivers 208A-208N, one or more antennas 210A-210N, a processor 212, a memory or other computer-readable storage medium 214, a receive (RX) data processor 216, and a demodulator (Demod) 218. Each of the transceivers 208A-208N may include a transmitter (TMTR) and a receiver (RCVR).

Alternately or additionally, the UE 201 may include, for example, a data source 220, a TX data processor 222, a modulator 224, one or more transceivers 226A-226N, one or more antennas 228A-228N, a processor 230, a memory or other computer-readable storage medium 232, and an RX data processor 234. Each of the transceivers 226A-226N may include a transmitter (TMTR) and a receiver (RCVR).

An example embodiment of operation of the components of the base station 200 and the UE 201 that are depicted in FIG. 2 will now be described. At the base station 200, traffic data for a number of data streams may be provided from the data source 202 to the TX data processor 204. The TX data processor 204 may format, code, and interleave the traffic data for each data stream based on a particular coding scheme selected for that data stream to provide coded data.

The coded data for each data stream may be multiplexed with pilot data using OFDM techniques. The pilot data may include a known data pattern that is processed in a known manner and that may be used at a receiver system to estimate channel response. The multiplexed pilot and coded data for each data stream may then be modulated (i.e., symbol mapped) based on a particular modulation scheme (e.g., BPSK, QSPK, M-PSK, or M-QAM) selected for that data stream to provide modulation symbols.

The data rate, coding, and modulation for each data stream may be determined by the processor 212 executing computer-executable instructions stored on the memory 214. Alternately or additionally, the processor 212 may execute computer-executable instructions stored on the memory 214 or other location that are effective to cause the base station 200 to perform one or more of the other operations described herein. The memory 214 may store computer-executable instructions such as program code, as well as data, and/or other information used by the processor 212 or other components of the base station 200.

The modulation symbols for all data streams may then be provided to the TX MIMO processor 206, which may further process the modulation symbols (e.g., for OFDM). The TX MIMO processor 206 may then provide modulation symbol streams to transceivers 208A-208N. In some embodiments, the TX MIMO processor 206 may apply beam-forming weights to the symbols of the data streams and/or to the antenna 210A-210N from which the symbol is being transmitted.

Each transceiver 208A-208N may receive and process a respective symbol stream to provide one or more analog signals, and may further condition (e.g., amplify, filter, and/or upconvert) the analog signals to provide a modulated signal suitable for transmission over the MIMO channel. Modulated signals from transceivers 208A-208N are then transmitted from antennas 210A-210N, respectively.

At the UE 201, the transmitted modulated signals may be received by antennas 228A-228N and the received signal from each antenna 228A-228N may be provided to a respective transceiver 226A-226N. Each transceiver 226A-226N may condition (e.g., filter, amplify, and/or downconvert) a respective received signal, digitize the conditioned signal to provide samples, and further process the samples to provide a corresponding "received" symbol stream.

The RX data processor 234 may then receive and process the received symbol streams from the transceivers 226A-226N based on a particular receiver processing technique to provide "detected" symbol streams. The RX data processor 234 may then demodulate, deinterleave, and decode each detected symbol stream to recover the traffic data for the data stream. The processing by the RX data processor 234 may be complementary to that performed by the TX MIMO processor 206 and the TX data processor 204 at the base station 200.

The processor 230 may periodically determine which precoding matrix to use. The processor 230 may formulate a reverse link message comprising a matrix index portion and a rank value portion. Alternately or additionally, the processor 230 may execute computer-executable instructions stored on the memory 232 or other location that are effective to cause the UE 201 to perform one or more of the operations described herein. The memory 232 may store computer executable instructions such as program code, as well as data and/or other information used by the processor 212 or other components of the UE 201.

Reverse link messages may be generated by the UE 201 and may include various types of information regarding the communication link between the UE 201 and the base station 200, and/or regarding the received data stream. For instance, reverse link messages may include a Channel Quality Indicator (CQI). Reverse link messages may be processed by the TX data processor 222, which may also receive traffic data for one or more data streams from the data source 220, modulated by the modulator 224, conditioned by the transceivers 226A-226N, and transmitted back to the base station 200.

At the base station 200, the modulated signals from the UE 201 may be received by the antennas 210A-210N, conditioned by the transceivers 208A-208N, demodulated by the demodulator 218, and processed by the RX data processor 216 to extract reverse link messages transmitted by the UE 201. The processor 212 may then determine which pre-coding matrix to use for determining the beam-forming weights and/or may then process the extracted message.

Figure 3:
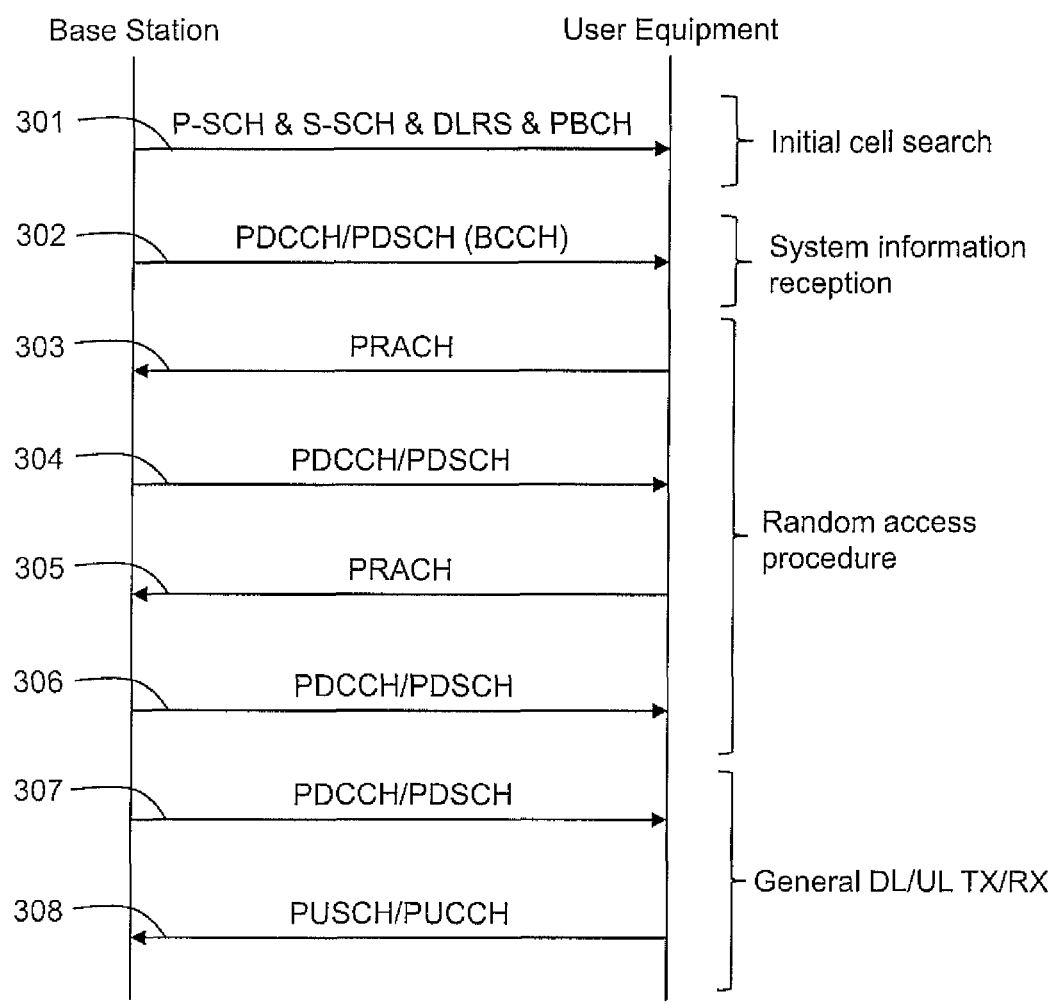
FIG. 3 depicts some example communication flows between a base station and a UE.

Various aspects of the LTE radio technology will now be described with respect to FIGS. 3-7B. FIG. 3 depicts some example communication flows 301-308 between a base station and a UE, arranged in accordance with at least some embodiments described herein. The communication flows 301-308 may be representative of some communication flows that may occur in a radio communication system implementing LTE radio technology. In FIG. 3, the base station may correspond to one of the base stations 102 of FIG. 1 and/or the base station 200 of FIG. 2, while the UE may correspond to one of the UEs 104 of FIG. 1 and/or the UE 201 of FIG. 2.

The UE may perform an initial cell search operation such as synchronization with the base station when the UE is powered on or when the UE enters a new cell, such as one of the cells 110 of FIG. 1. During the initial cell search, the UE may receive a Primary Synchronization Channel (P-SCH) and a Secondary Synchronization Channel (S-SCH) from the base station, perform synchronization with the base station, and acquire information such as a cell ID. Thereafter, the UE may receive a physical broadcast channel (PBCH) from the base station so as to acquire broadcast information within the cell. The UE may also receive a Downlink Reference Signal (DLRS) to confirm a downlink channel state in the initial cell search step. The transmission of the P-SCH, S-SCH, DLRS and PBCH to the UE is depicted at communication flow 301.

After completion of the initial cell search, the UE may acquire more detailed system information. In particular, the UE may receive a PDCCH and a Physical Downlink Shared Channel (PDSCH) according to information included in the PDCCH. The transmission of the PDCCH and PDSCH to the UE is depicted at communication flow 302.

Meanwhile, if the base station is being initially accessed or radio resources for signal transmission are not present, the UE may perform a Random Access Procedure (RACH) with respect to the base station that may involve the transmission and reception of certain data over various channels depicted at communication flows 303-306. For example, the UE may transmit a specific sequence through a Physical Random Access Channel (PRACH) as a preamble at communication flows 303 and/or 305, and receive a response message of the preamble through the PDCCH and the PDSCH corresponding thereto at communication flows 304 and/or 306. Although not shown, in the case of contention-based RACH, a contention resolution procedure may be further performed.

After completion of the RACH, the UE may perform general downlink (DL) and uplink (UL) transmission and reception via the PDCCH and PDSCH depicted at communication flow 307, and/or via a Physical Uplink Shared Channel (PUSCH) and Physical Uplink Control Channel (PUCCH) depicted at communication flow 308. The control information transmitted from the UE to the base station in the uplink or transmitted from the base station to the UE in the downlink may include, but is not limited to, a downlink/uplink acknowledgment (ACK) or negative ACK (HACK), a CQI, a Precoding Matrix Index (PMI) a Rank Indicator (RI), or the like or any combination thereof. In the case of the 3GPP LTE system, the UE may transmit the control information such as CQI/PMI/RI through the PUSCH and/or the PUCCH.

Figure 4:
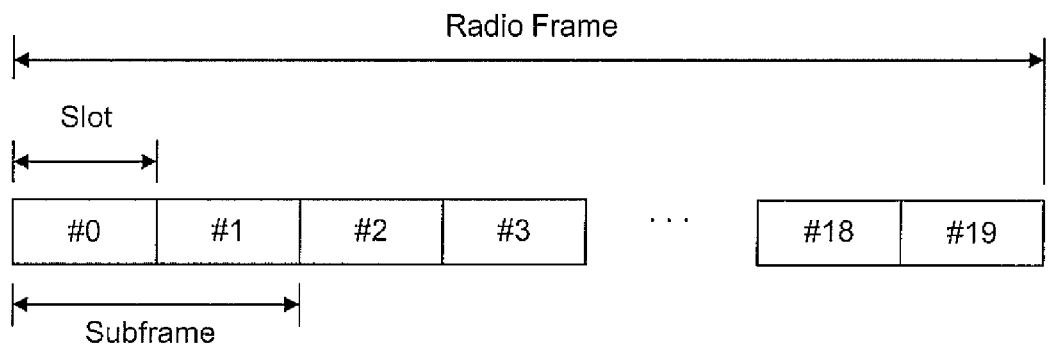
FIG. 4 is a schematic diagram of an example radio frame such as may be implemented in a Long Term Evolution (LTE) network.

FIG. 4 is a schematic diagram of an example radio frame such as may be implemented in an LTE network, arranged in accordance with at least some embodiments described herein. The radio frame has ten subframes of equal length. Each subframe has two slots. In the 3GPP LTE system, the subframe is defined as the basic time unit of packet scheduling with respect to an overall downlink frequency.

The radio frame has a length of 10 milliseconds (ms). Each subframe has a length of 1 ms. Each slot has a length of 0.5 ms. Each slot includes multiple OFDM symbols in a time domain, and multiple resource blocks (RBs) in a frequency domain. A Transmission Time Interval (TTI) which is a unit time for transmission of data may be determined in units of one or more subframes. The architecture of the radio frame of FIG. 4 is provided by way of example only and the number of subframes included in the radio frame, the number of slots included in the subframe, the number of OFDM symbols included in the slot, and/or the lengths of the radio frame, subframe and/or slot may be variously changed.

Figure 5:
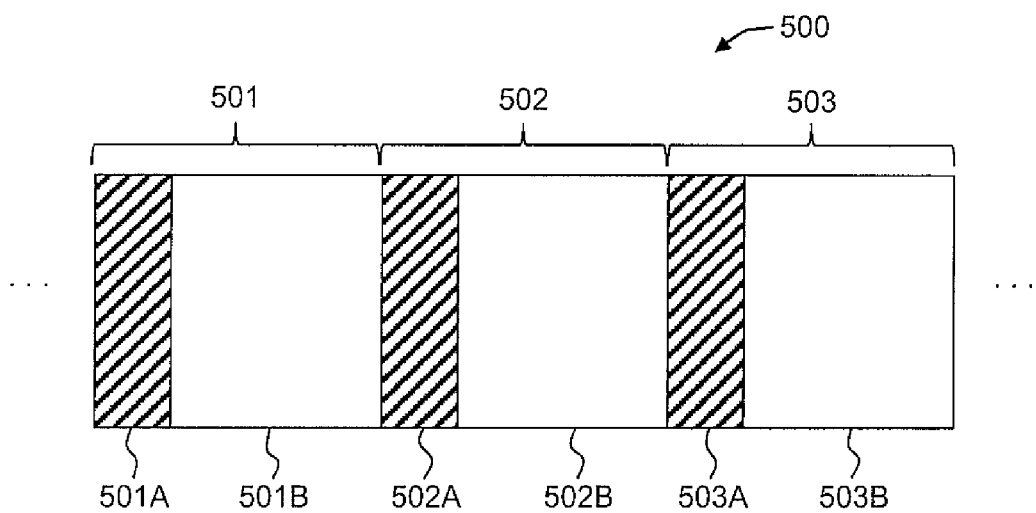
FIG. 5 is a schematic diagram of the radio frame of FIG. 4 implemented as a downlink radio frame and including multiple subframes.

FIG. 5 is a schematic diagram of the radio frame of FIG. 4 implemented as a downlink radio frame 500 and including multiple subframes 501, 502, 503, arranged in accordance with at least some embodiments described herein. Although only three subframes 501-503 are depicted in FIG. 5, the downlink radio frame 500 may include ten subframes, or some other number of subframes.

In the illustrated embodiment of FIG. 5, each subframe 501-503 is divided into a control region 501A, 502A, 503A and a data region 501B, 502B, 503B, respectively. Each control region 501A, 502A, 503A is a time interval for transmission of scheduling information and other control information. Each data region 501B, 502B, 503B is a time interval for transmission of downlink data. The control regions 501A, 502A, 503A each start from a first OFDM symbol of the respective subframe 501-503 and each include one or more OFDM symbols. The size of the control region 501A, 502A, 503A may be independently set for each subframe 501-503.

Figure 6:
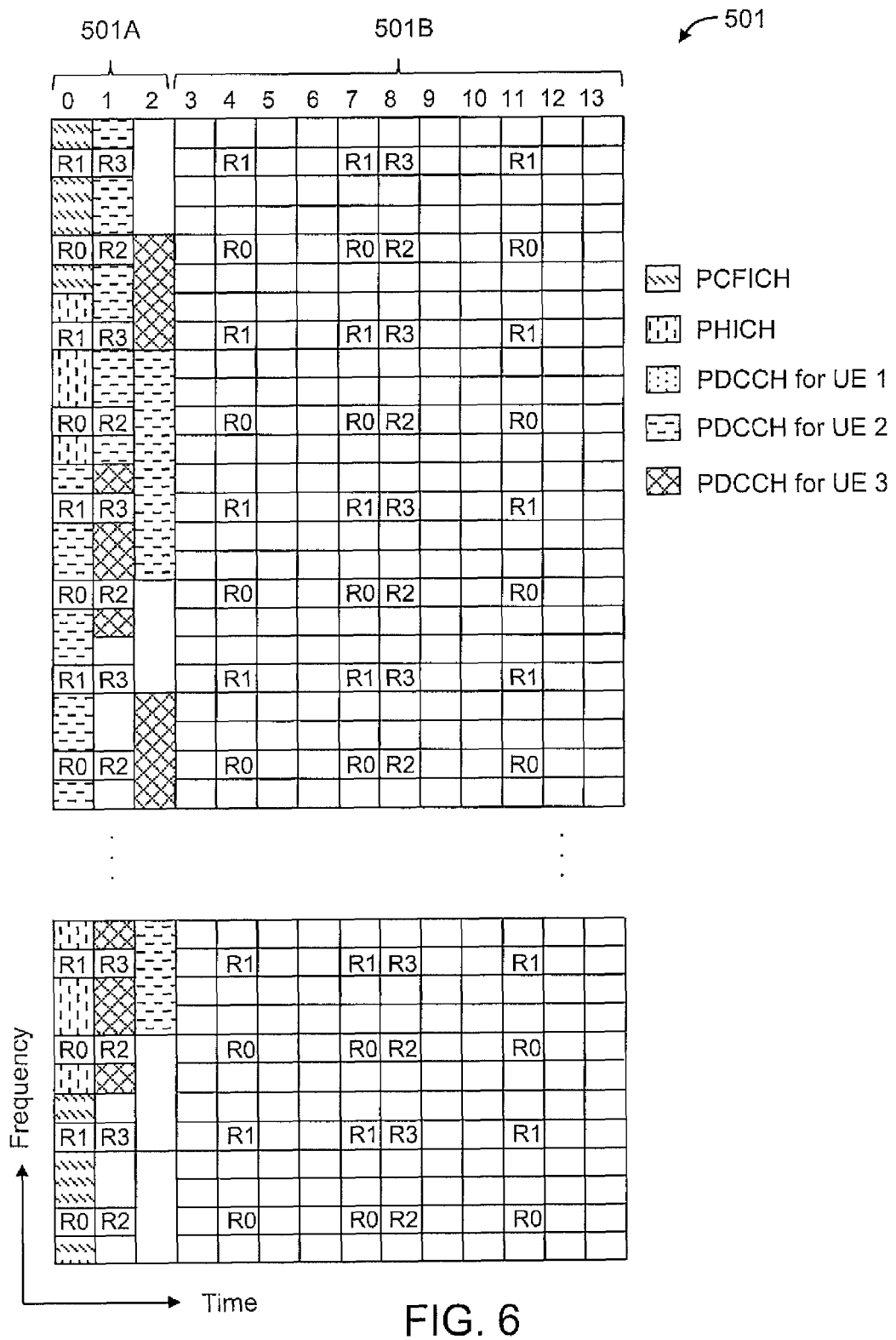
FIG. 6 depicts a control channel that may be included in a control region of one of the subframes of FIG. 5.

FIG. 6 depicts control channels that may be included in a control region 501A of one of the subframes 501 of FIG. 5, arranged in accordance with at least some embodiments. In FIG. 6, the subframe 501 includes 14 OFDM symbols, labeled 0, 1, 2, ..., 13. The first one to three OFDM symbols are included in the control region 501A and the remaining thirteen to eleven OFDM symbols are included in the data region 501B. In FIG. 6, R0, R1, R2 and R3 denote Reference Signals (RS), or pilot signals of corresponding antennas 0, 1, 2 and 3 (not shown). The RS may be fixed within the subframe 501 with a constant pattern regardless of the control region 501A and data region 501B.

Control channels are resources in the control region 501A to which the RSs are not allocated. Analogously, traffic channels are resources in the data region 501B to which the RSs are not allocated. The control channels may include a Physical Control Format Indicator Channel (PCFICH), a Physical Hybrid-ARQ Indicator Channel (PHICH), one or more PDCCHs, and the like or any combination thereof.

The PCFICH informs the UE of the number of OFDM symbols used in the PDCCH for each subframe. The PCFICH is located at a first OFDM symbol and is set prior to the PHICH and the PDCCH. The PCFICH is composed of four Resource Element Groups (REGs), and the REGs are distributed within the control region based on CELL-ID. One REG is composed of four Resource Elements (REs). The RE refers to a minimum physical resource defined by one subcarrier times one OFDM symbol. An example architecture of a REG is described with respect to FIG. 7 below. The PCFICH value may indicate a value of one to three or two to four according to a bandwidth and may be modulated suing a QPSK scheme.

The PHICH is used to transfer a Hybrid Automatic Repeat and reQuest (HARQ) ACK/NACK signal linked to uplink transmission. That is, the PHICH refers to a channel used for transmitting DL ACK/NACK information for UL HARQ. The PHICH is composed of one REG and is scrambled on a cell-specific basis. The ACK/NACK signal is indicated by 1 bit and is modulated using a BPSK scheme. The modulated ACK/NACK signal is spread using a Spreading Factor (SF) of two or four. Multiple PHICHs mapped to the same resources configures a PHICH group. The number of PHICHs multiplexed in the PHICH group is determined according to the number of spreading codes. The PHICH (group) is repeated three times in order to obtain a diversity gain in a frequency domain and/or a time domain.

The PDCCH is allocated to first n OFDM symbols of the subframe. Here, n is an integer of one or more and is indicated by the PCFICH. The PDCCH is composed of one or more Control Channel Elements (CCEs), which are described below. The PDCCH informs UEs or a UE group of information associated with resource allocation of a Paging Channel (PCH) and a Downlink-Shared Channel (DL-SCH) of a transport channel, Uplink scheduling grant, HARQ information, or the like. The PCH and the DL-SCH are transmitted through the PDSCH. Accordingly, the base station and the UE may generally transmit and receive data through the PDSCH except for specific control information or specific service data.

Information indicating to which UE (one or multiple UEs) the data of the PDSCH is transmitted and how UEs receive and decode the data of the PDSCH is transmitted through the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, etc.) "C" is transmitted via a specific subframe. In this case, a UE located within a cell monitors PDCCH using its own RNTI information, and if one or more UEs having "A" RNTI are present, the UEs receive the PDCCH and receive the PDSCH indicated by "B" and "C" through the information about the received PDCCH.

Figure 7A:
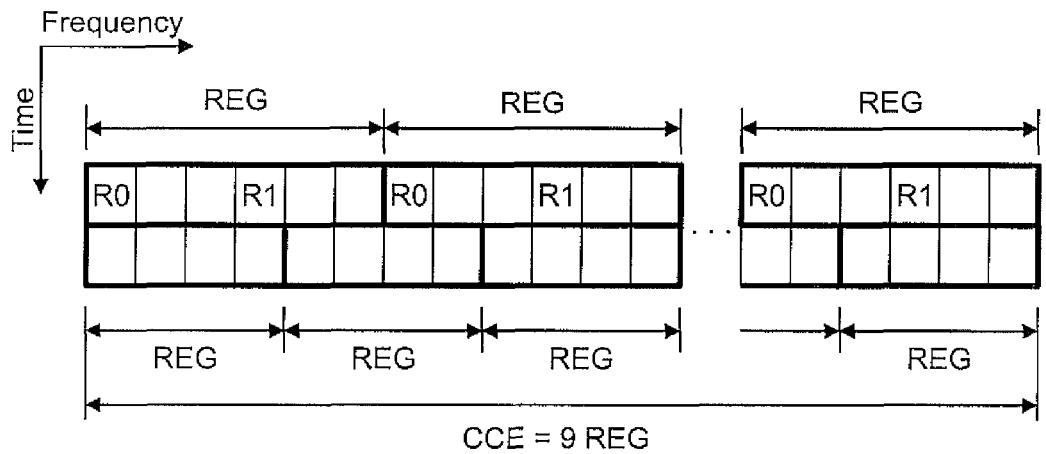
FIGS. 7A and 7B schematically depict a resource unit for configuring a control channel.
Figure 7B:
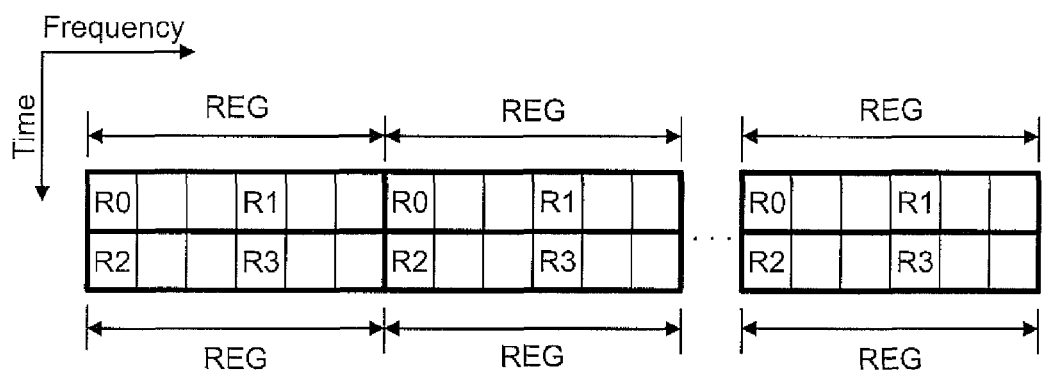

FIGS. 7A and 7B schematically depict a resource unit for configuring a control channel, arranged in accordance with at least some embodiments described herein. FIG. 7A depicts an example where the number of transmission antennas is 1 or 2 and FIG. 7B depicts an example where the number of transmission antennas is 4, which are different from each other in only an RS pattern according to the number of transmission antennas, but are equal to each other in a method of setting a resource unit associated with the control channel.

Referring to FIGS. 7A and 7B, a REG which is the basic resource unit of the control channel is composed of four neighbor REs in a state of excluding the RS. Each REG is denoted by a relatively thick outline in FIGS. 7A-7B. The PCFICH and the PHICH include four REGs and three REGs, respectively. The PDCCH is composed of CCE units and one CCE includes 9 REGs.

The UE may be set to confirm that the number of PDCCH candidates, $M^{(L)}$, is greater than or equal to L CCEs which are arranged consecutively or according to a specific rule in order to determine whether a PDCCH composed of L CCEs is transmitted to the UE. The value L considered when the UE receives the PDCCH may be plural. A set of CCEs which should be confirmed when the UE receives the PDCCH is referred to as a PDCCH search space. For example, in the LTE system, the PDCCH search space is defined as shown in Table 1.

TABLE 1

| Type | Search space $S_k^{(L)}$ Aggregation level L | Size (in CCEs) | Number of PDCCH candidates $M^{(L)}$ | DCI formats |
|---|---|---|---|---|
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

L denotes the number of CCEs configuring the PDCCH, $S_k^{(L)}$ denotes the PDCCH search space, and $M^{(L)}$ denotes the number of PDCCH candidates to be monitored in the search space.

The PDCCH search space may be divided into a specific search space in which access is allowed for only a specific UE and a common search space in which access is allowed for all UEs within a cell. The UE monitors the common search space at L=4 and 8 and monitors the specific search space at L=1, 2, 4 and 8. The common search space and the specific search space may overlap each other.

FIG. 8 schematically depicts an example of PDCCHs in the common search space of each of two adjacent cells with overlapping time-frequency resources, arranged in accordance with at least some embodiments described herein. In particular, FIG. 8 illustrates a portion of a first subframe 802 including a first control region 804 having a first PDCCH in a common search space denoted at 806 for a first cell. FIG. 8 also illustrates a portion of a second subframe 808 including a second control region 810 having a second PDCCH in a common search space denoted at 812 for a second cell. Finally, FIG. 8 also illustrates a table 814 identifying locations of overlapping time frequency resources 816 between the first PDCCH 806 in the common search space for the first cell and the second PDCCH 812 in the common search space for the second cell.

Whereas the transmitting power of the first and second PDCCHs 806, 812 in the common search space for the first and second cells may be relatively high to ensure coverage at the respective peripheries of the first and second cells, interference at the locations of overlapping time-frequency resources 816 can be significant. The interference at the locations of overlapping time-frequency resources 816 can significantly reduce reception performance of the first and second PDCCHs 806, 812 in the common search space for UEs near the peripheries of the first and second cells, preventing or inhibiting the ability of the UEs to correctly decode scheduling information in the first and second PDCCHs 806, 812, which may prevent the UEs from correctly reading system information and paging information included in the scheduling information.

Figure 9:
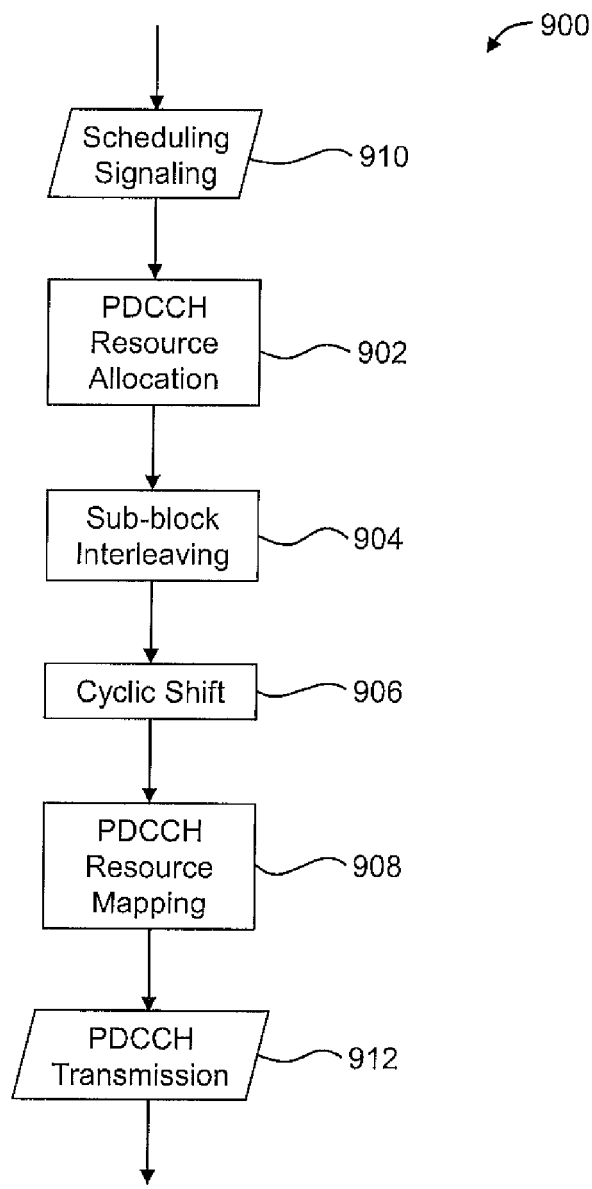
FIG. 9 shows an example flow diagram of a method for communicating over a PDCCH channel that may be implemented in an LTE system.

According to standards established by the 3GFP, such as the 3GPP LTE standard, the time-frequency resource locations to which the PDCCH in the common search space for a given base station is mapped is related to the CELL-ID of the base station. For example, FIG. 9 shows an example flow diagram of a method 900 for communicating over a PDCCH channel that may be implemented in an LTE system, arranged in accordance with at least some embodiments described herein. The method 900 may be performed in whole or in part by, e.g., one of the base stations 102 of FIG. 1 and/or the base station 200 of FIG. 2. The method 900 includes various operations, functions or actions as illustrated by one or more of blocks 902, 904, 906, and/or 908. The method 900 may begin at block 902.

In block 902, PDCCH resources are allocated for incoming scheduling signaling 910. Block 902 may be followed by block 904.

In block 904, sub-block interleaving is performed. Block 904 may be followed by block 906.

In block 906, a cyclic shift is provided on the PDCCH in the common search space. A size of the cyclic shift of the PDCCH in the common search space is related to the CELL-ID of the base station/cell. Providing a cyclic shift having a size related to the CELL-ID gives rise to the relationship between the time-frequency resource locations to which the PDCCH in the common search space for a given base station is mapped and the CELL-ID of the base station. Block 906 may be followed by block 908.

In block 908, the PDCCH in the common search space is mapped to a specific time-frequency resource location of a corresponding downlink subframe to produce a downlink PDCCH transmission 912.

Thus, as described with respect to FIG. 9, the specific time-frequency resource location to which the PDCCH in the common search space is mapped may be related to the CELL-ID of the base station from which the PDCCH in the common search space originates (hereinafter the "originating base station") according to some embodiments and/or as defined by the 3GPP LTE standard. Hereinafter, $L_{Comm\text{-}PDDCH}$ will be used to indicate the time-frequency resource location of the PDCCH in the common search space. Further, the relationship between the time-frequency resource location $L_{Comm\text{-}PDCCH}$ and CELL-ID of the originating base station can be expressed as $L_{Comm\text{-}PDCCH} = f(CELL\text{-}ID)$.

Various example methods relating to allocating CELL-IDs to reduce interference between adjacent cells will now be described.

According to some embodiments described herein, CELL-IDs of cells in a radio communication network are assigned such that the common search space of PDCCHs in adjacent cells can be interleaved with a maximum probability at the time-frequency location, which may avoid strong mutual interference between the common search spaces of PDCCHs. In some radio communication networks such as LTE systems, the range of potential values for the CELL-IDs may include the integers from 0 to 503 inclusive.

In these and other embodiments, suppose a cell i has a CELL-ID denoted by $(CELL\text{-}ID)_i$ and an adjacent cell j that is adjacent to the cell i has a CELL-ID denoted by $(CELL\text{-}ID)_j$. Thus, the PDCCHs in the common search space of the cell i and the adjacent cell j may have a conflict probability at the time-frequency resource location that may be denoted by $P((L_{Comm\text{-}PDCCH})_i = (L_{Comm\text{-}PDCCH})_j)$. In some embodiments, the PDCCHs in the common search space of the cell i and the adjacent cell j can be interleaved with a maximum probability when formula 1 and formula 2 provided below are satisfied.

$$|(CELL\text{-}ID)_i - (CELL\text{-}ID)_j| = \delta_m \qquad \text{(formula 1)}$$

$$\delta_m = \delta_n \left[ \left| \sum_{j=1}^{k} P\left( (L_{Comm\text{-}PDCCH})_i = (L_{Comm\text{-}PDCCH})_j \right) \right| = P_{min} \right] \qquad \text{(formula 2)}$$

According to formula 1, $(CELL\text{-}ID)_i$ and $(CELL\text{-}ID)_j$ are selected such that an absolute value of the difference between $(CELL\text{-}ID)_i$ and $(CELL\text{-}ID)_j$ is equal to $\delta_m$. According to formula 2, $\delta_m$ is an element of an aggregate $\delta_n$ which makes a sum of conflict probability in a common search space of the cell i and in a common search space of one or more adjacent cells k have a minimum value $P_{min}$. In formula 2, $\delta_m$ is an integer, $(L_{Comm\text{-}PDCCH})_i$ is a time-frequency resource location of a PDCCH in the common search space of the cell i, $(L_{Comm\text{-}PDCCH})_j$ is a time-frequency resource location of a PDCCH in the common search space of a particular adjacent cell j, and $P((L_{Comm\text{-}PDCCH})_i = (L_{Comm\text{-}PDCCH})_j)$ is a conflict probability at a time-frequency resource location of the PDCCHs in the common search spaces of the first cell i and the particular adjacent cell j.

There may be a single element $\delta_m$ which makes the sum of the conflict probability have the minimum value $P_{min}$. Alternately or additionally, there may be multiple elements $\delta_m$ having different values that each make the sum of the conflict probability have the minimum value $P_{min}$.

In some embodiments, the aggregate $\delta_n$ includes the integers from 0 to 503 inclusive, or a subset thereof. For example, the aggregate $\delta_n$ may include the integers from 3 to 11 inclusive.

In connection with the provisions of the 3GPP standards with respect to PDCCH interleaving, when $\delta_m$ is within a certain range or equal to a specific value, the conflict probability $P((L_{Comm\text{-}PDCCH})_i = (L_{Comm\text{-}PDCCH})_j)$ can be maintained at or below the minimum value $P_{min}$. In some embodiments, for instance, when $\delta_m$ is in a range from 3 to 11 inclusive and formulas 1 and 2 are satisfied, the conflict probability $P((L_{Comm\text{-}PDCCH})_i = (L_{Comm\text{-}PDCCH})_j)$ can be maintained at or below $P_{min} = 20\%$.

Compared with other CELL-ID allocation methods in which CELL-IDs are allocated in sequence or at random, some embodiments of CELL-ID allocation methods described herein can substantially reduce and/or eliminate strong mutual interference between PDCCHs in the common search spaces and/or can substantially improve the success rate of UEs to decode the PDCCH in the common search space such that UEs in the periphery of a cell can correctly receive scheduling information.

Figure 10:
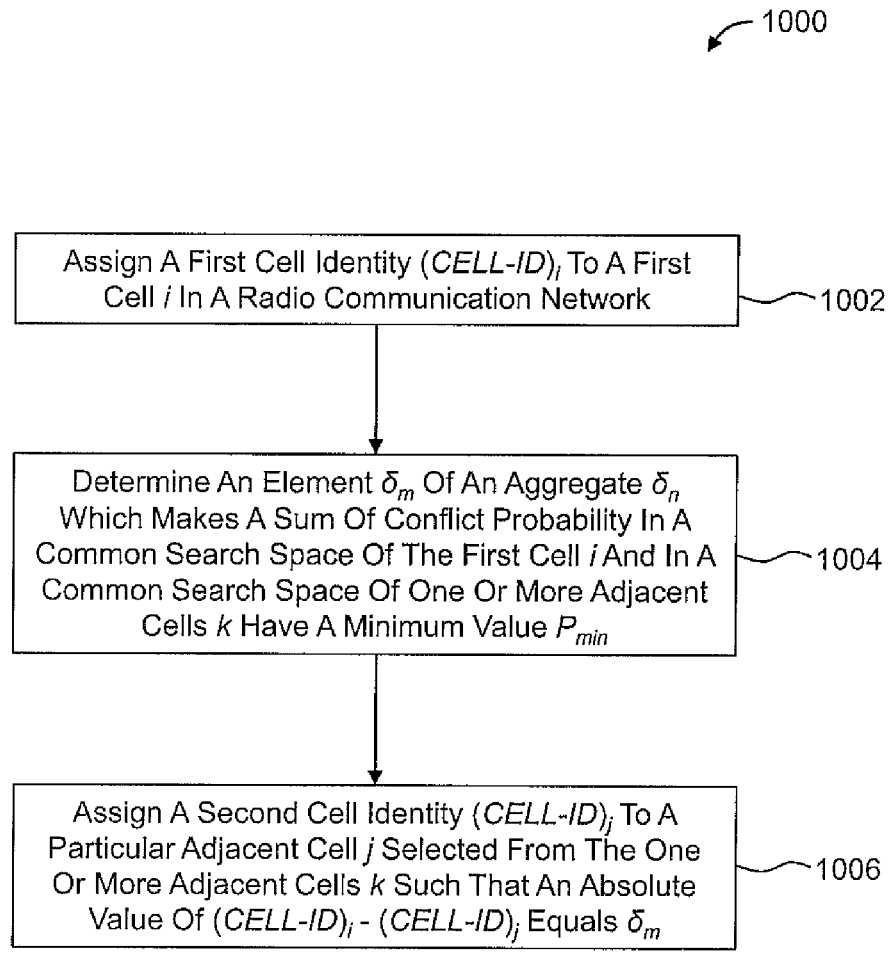
FIG. 10 shows an example flow diagram of a method for allocating a CELL-ID to a particular cell in a radio communication system.

FIG. 10 shows an example flow diagram of a method 1000 for allocating a CELL-ID to a particular cell in a radio communication network, arranged in accordance with at least some embodiments described herein. The method 1000 may be performed in whole or in part by, e.g., the network controller 106 of FIG. 1. The method 1000 includes various operations, functions or actions as illustrated by one or more of blocks 1002, 1004, and/or 1006. The method 1000 may begin at block 1002.

In block 1002, ["Assign A First Cell Identity (CELL-ID)$_i$ To A First Cell i In A Radio Communication Network"], a first cell identity (CELL-ID)$_i$ is assigned to a first cell i in a radio communication network. The radio communication network may include, e.g., the radio communication network 100 of FIG. 1. The first cell i may include the cell 110A of FIG. 1. Assigning the first cell identity (CELL ID)$_i$ to the first cell i may include assigning the first cell identity (CELL-ID)$_i$ to the base station 102A servicing UEs 104 within the cell 110A. Block 1002 may be followed by block 1004.

In block 1004, ["Determine An Element $\delta_m$ Of An Aggregate $\delta_n$ Which Makes A Sum Of Conflict Probability In A Common Search Space Of The First Cell i And In A Common Search Space Of One Or More Adjacent Cells k Have A Minimum Value $P_{min}$"], an element $\delta_m$ of an aggregate $\delta_n$ is determined which makes a sum of conflict probability in a common search space of the first cell i and in a common search space of one or more adjacent cells k have a minimum value $P_{min}$. In some embodiments, determining the element $\delta_m$ of the aggregate $\delta_n$ includes determining the element $\delta_m$ according to formula 2 provided above.

In these and other embodiments, the time-frequency resource location of the PDCCH in the common search space of the first cell i, $(L_{Comm-PDCCH})_i$, may depend on the first Cell Identity (CELL-ID)$_i$ as defined by the 3GPP LTE standard. Alternately or additionally, the time-frequency resource location of the PDCCH in the common search space of the particular adjacent cell j, $(L_{Comm-PDCCH})_j$, may be a function of the second Cell Identity (CELL-ID)$_j$ as defined by the 3GPP LTE standard.

Block 1004 may be followed by block 1006.

In block 1006, ["Assign A Second Cell Identity (CELL-ID)$_j$ To A Particular Adjacent Cell j Selected From The One Or More Adjacent Cells k Such That An Absolute Value Of (CELL-ID)$_i$–(CELL-ID)$_j$ Equals $\delta_m$"], a second cell identity (CELL-ID)$_j$ is assigned to a particular adjacent cell j selected from the one or more adjacent cells k such that an absolute value of a difference between (CELL-ID)$_i$ and (CELL-ID))$_j$ equals $\delta_m$.

Although not required, $\delta_m$ may be an integer in a range between 0 and 503 inclusive, e.g., $0 \leq \delta_m \leq 503$. Alternately or additionally, $\delta_m$ may be an integer in a range between 3 and 11 inclusive, e.g., $3 \leq \delta_m \leq 11$.

In some embodiments, the minimum value $P_{min}$ may be less than or equal to about 40% such that the conflict probability $P((L_{COMM-PDCCH})_i = (L_{Comm-PDCCH})_j)$ is less than or equal to about 40%. Alternately or additionally, the minimum value $P_{min}$ may be less than or equal to about 20% such that the conflict probability $P((L_{COMM-PDCCH})_i = (L_{Comm-PDCCH})_j)$ is less than or equal to about 20%.

Some embodiments disclosed herein include a computer-readable storage medium having computer-executable instructions stored thereon that are executable by a computing device to perform operations included in the method 1000 of FIG. 10, such as the operations illustrated by blocks 1002, 1004 and/or 1006 in FIG. 10, and/or variations thereof. In these and other embodiments, the computing device may be included in the network controller. For instance, the computing device may include the processor 106A included in the network controller 106 of FIG. 1. Alternately or additionally, the computer-readable storage medium may include the computer-readable medium 106B included in the network controller 106 of FIG. 2.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 11:
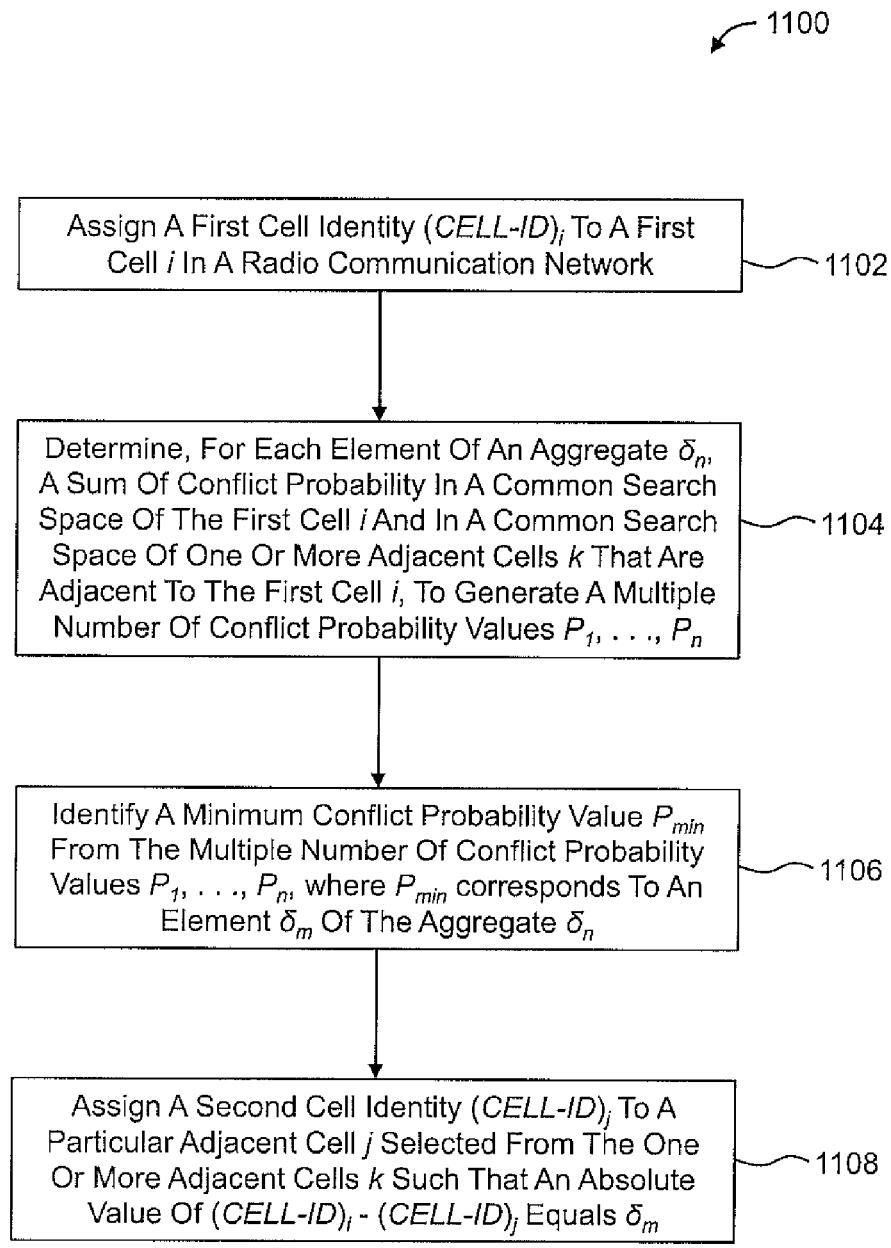
FIG. 11 shows an example flow diagram of a method for allocating CELL-IDs to cells in a radio communication network, all arranged in accordance with at least some embodiments described herein.

FIG. 11 shows an example flow diagram of a method 1100 for allocating CELL-IDs to cells in a radio communication network, arranged in accordance with at least some embodiments described herein. The method 1100 may be performed in whole or in part by, e.g., the network controller 106 of FIG. 1. The method 1100 includes various operations, functions or actions as illustrated by one or more of blocks 1102, 1104, 1106, and/or 1108. The method 1100 may begin at block 1102.

In block 1102, ["Assign A First Cell Identity (CELL-ID)$_i$ To A First Cell i In A Radio Communication Network"], a first cell identity (CELL-ID)$_i$ is assigned to a first cell i in a radio communication network. The radio communication network may include, e.g., the radio communication network 100 of FIG. 1. The first cell i may include the cell 110A of FIG. 1. Assigning the first cell identity (CELL-ID)$_i$ to the first cell i may include assigning the first cell identity (CELL-ID)$_i$ to, e.g., the base station 102A servicing UEs 104 within the cell 110A of FIG. 1. Block 1102 may be followed by block 1104.

In block 1104, ["Determine, For Each Element Of An Aggregate $\delta_n$, A Sum Of Conflict Probability In A Common Search Space Of The First Cell i And In A Common Search Space Of One Or More Adjacent Cells k That Are Adjacent To The First Cell i, To Generate A Multiple Number Of Conflict Probability Values $P_1, \ldots, P_n$"], a sum of conflict probability in a common search space of the first cell i and in a common search space of one or more adjacent cells k is determined for each element of an aggregate $\delta_n$ to generate a multiple number of conflict probability values $P_1, \ldots, P_n$. In some embodiments, the sum of the conflict probability is determined for each element of the aggregate $\delta_n$ according to formula 2 provided above.

In these and other embodiments, the time-frequency resource location of the PDCCH in the common search space of the first cell i, $(L_{Comm-PDCCH})_i$, may depend on the first Cell Identity (CELL-ID)$_i$ as defined by the 3GPP LTE standard. Alternately or additionally, the time-frequency resource location of the PDCCH in the common search space of the particular adjacent cell j, $(L_{Comm-PDCCH})_j$, may be a function of the second Cell Identity (CELL-ID)$_j$ as defined by the 3GPP LTE standard.

Block 1104 may be followed by block 1106.

In block 1106, ["Identify A Minimum Conflict Probability Value $P_{min}$ From The Multiple Number Of Conflict Probability Values $P_1, \ldots, P_n$, where $P_{min}$ corresponds To An Element $\delta_n$ Of The Aggregate $\delta_n$"], a minimum conflict probability value $P_{min}$ is identified from the multiple number of conflict probability values $P_1, \ldots, P_n$. $P_{min}$ may correspond to an element $\delta_m$ of the aggregate $\delta_n$. Block 1106 may be followed by block 1108.

In block 1108, ["Assign A Second Cell Identity (CELL-ID)$_j$ To A Particular Adjacent Cell j Selected From The One Or More Adjacent Cells k Such That An Absolute Value Of (CELL-ID)$_i$–(CELL-ID)$_j$ Equals $\delta_m$"], a second cell identity (CELL-ID)$_j$ is assigned to a particular adjacent cell j selected from the one or more adjacent cells k such that an absolute value of a difference between $(CELL\text{-}ID)_i$ and $(CELL\text{-}ID)_j$ equals $\delta_m$.

Although not required, $\delta_m$ may be an integer in a range between 0 and 503 inclusive, e.g., $0 \leq \delta_m \leq 503$. Alternately or additionally, $\delta_m$ may be an integer in a range between 3 and 11 inclusive, e.g., $3 \leq \delta_m \leq 11$.

In some embodiments, the minimum value $P_{min}$ may be less than or equal to about 40% such that the conflict probability $P((L_{Comm\text{-}PDCCH})_i = (L_{Comm\text{-}PDCCH})_j)$ is less than or equal to about 40%. Alternately or additionally, the minimum value $P_{min}$ may be less than or equal to about 20% such that the conflict probability $P((L_{Comm\text{-}PDCCH})_i = (L_{Comm\text{-}PDCCH})_j)$ is less than or equal to about 20%.

Some embodiments disclosed herein include a computer-readable storage medium having computer-executable instructions stored thereon that are executable by a computing device to perform operations included in the method 1100 of FIG. 11, such as the operations illustrated by blocks 1102, 1104, 1106 and/or 1108 in FIG. 11, and/or variations thereof. In these and other embodiments, the computing device may be included in the network controller. For instance, the computing device may include the processor 106A included in the network controller 106 of FIG. 1. Alternately or additionally, the computer-readable storage medium may include the computer-readable medium 106B included in the network controller 106 of FIG. 2.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for allocating a Cell Identity (CELL-ID) to a particular cell in a radio communication network, the method comprising:
assigning a first Cell Identity $(CELL\text{-}ID)_i$ to a first cell i in a radio communication network;
determining an element $\delta_m$ of an aggregate $\delta_n$ which makes a sum of conflict probability in a common search space of the first cell i and in a common search space of one or more adjacent cells k have a minimum value $P_{min}$, wherein $\delta_m$ is an integer; and
assigning a second Cell Identity $(CELL\text{-}ID)_j$ to a particular adjacent cell j selected from the one or more adjacent cells k such that an absolute value of $(CELL\text{-}ID)_i - (CELL\text{-}ID)_j$ equals $\delta_m$.

2. The method of claim 1, wherein determining the element $\delta_m$ of the aggregate $\delta_n$ includes determining the element $\delta_m$ according to the following formula:

$$\delta_m = \delta_n \left| \left[ \sum_{j=1}^{k} P\left( (L_{Comm\text{-}PDCCH})_i = (L_{Comm\text{-}PDCCH})_j \right) \right] = P_{min} \right|,$$

wherein:
$(L_{Comm\text{-}PDCCH})_i$ is a time-frequency resource location of a physical downlink control channel ("PDCCH") in the common search space of the first cell i;
$(L_{Comm\text{-}PDCCH})_j$ is a time-frequency resource location of a PDCCH in a common search space of the particular adjacent cell j; and
$P((L_{Comm\text{-}PDCCH})_i = (L_{Comm\text{-}PDCCH})_j)$ is a conflict probability at a time-frequency position of the PDCCHs in the common search spaces of the first cell i and the particular adjacent cell j.

3. The method of claim 2, wherein $\delta_m$ is in a range between 0 and 503 inclusive.

4. The method of claim 3, wherein $\delta_m$ is in a range between 3 and 11 inclusive.

5. The method of claim 4, wherein the conflict probability $P((L_{Comm\text{-}PDCCH})_i = (L_{Comm\text{-}PDCCH})_j)$ is less than or equal to about 20%.

6. The method of claim 2, wherein:
the time-frequency resource location of the PDCCH in the common search space of the first cell i, $(L_{Comm\text{-}PDCCH})_i$, depends on the first Cell Identity $(CELL\text{-}ID)_i$ as defined by the 3rd Generation Partnership Project ("3GPP") Long Term Evolution ("LTE") standard; and
the time-frequency resource location of the PDCCH in the common search space of the particular adjacent cell j, $(L_{Comm\text{-}PDCCH})_j$, is a function of the second Cell Identity $(CELL\text{-}ID)_j$ as defined by the 3GPP LTE standard.

7. A computer-readable storage medium having computer-executable instructions stored thereon that are executable by a computing device to perform operations comprising:
assigning a first Cell Identity $(CELL\text{-}ID)_i$ to a first cell i in a radio communication network;
determining an element $\delta_m$ of an aggregate $\delta_n$ which makes a sum of conflict probability in a common search space of the first cell i and in a common search space of one or more adjacent cells k have a minimum value $P_{min}$, wherein $\delta_m$ is an integer; and
assigning a second Cell Identity $(CELL\text{-}ID))_j$ to a particular adjacent cell j selected from the one or more adjacent cells k such that an absolute value of $(CELL\text{-}ID)_i - (CELL\text{-}ID)_j$ equals $\delta_m$.

8. The computer-readable storage medium of claim 7, wherein determining the element $\delta_m$ of the aggregate $\delta_n$ includes determining the element $\delta_m$ according to the following formula:

$$\delta_m = \delta_n \left| \left[ \sum_{j=1}^{k} P\left( (L_{Comm\text{-}PDCCH})_i = (L_{Comm\text{-}PDCCH})_j \right) \right] = P_{min} \right|,$$

wherein:
$(L_{Comm\text{-}PDCCH})_i$ is a time-frequency resource location of a physical downlink control channel ("PDCCH") in the common search space of the first cell i;
$(L_{Comm\text{-}PDCCH})_j$ is a time-frequency resource location of a PDCCH in a common search space of the particular adjacent cell j; and
$P((L_{Comm\text{-}PDCCH})_i = (L_{Comm\text{-}PDCCH})_j)$ is a conflict probability at a time-frequency position of the PDCCHs in the common search spaces of the first cell i and the particular adjacent cell j.

9. The computer-readable storage medium of claim 8, wherein $\delta_m$ is in a range between 0 and 503 inclusive.

10. The computer-readable storage medium of claim 9, wherein $\delta_m$ is in a range between 3 and 11 inclusive.

11. The computer-readable storage medium of claim 10, wherein the conflict probability $P((L_{Comm\text{-}PDCCH})_i = (L_{Comm\text{-}PDCCH})_j)$ is less than or equal to about 20%.

12. The computer-readable storage medium of claim 8, wherein:
the time-frequency resource location of the PDCCH in the common search space of the first cell i, $(L_{Comm\text{-}PDCCH})_i$, is determined by the first Cell Identity $(CELL\text{-}ID)_i$ as defined by the 3rd Generation Partnership Project ("3GPP") Long Term Evolution ("LTE") standard; and
the time-frequency resource location of the PDCCH in the common search space of the particular adjacent cell j, $(L_{Comm\text{-}PDCCH})_j$, is determined by the second Cell Identity $(CELL\text{-}ID)_j$ as defined by the 3GPP LTE standard.

13. A method for allocating Cell Identities (CELL-IDs) to cells in a radio communication network, the method comprising:
assigning a first Cell Identity $(CELL\text{-}ID)_i$ to a first cell i in a radio communication network;
determining, for each element of an aggregate $\delta_n$, a sum of conflict probability in a common search space of the first cell i and in a common search space of one or more adjacent cells k that are adjacent to the first cell i, to generate a plurality of conflict probability values $P_1, \ldots, P_n$;
identifying a minimum conflict probability value $P_{min}$ from the plurality of conflict probability values $P_1, \ldots, P_n$, wherein $P_{min}$ corresponds to an element $\delta_m$ of the aggregate $\delta_n$; and
assigning a second Cell Identity $(CELL\text{-}ID)_j$ to a particular adjacent cell j selected from the one or more adjacent cells k such that an absolute value of $(CELL\text{-}ID)_i - (CELL\text{-}ID)_j$ equals $\delta_m$.

14. The method of claim 13, wherein $\delta_m$ is in a range between 0 and 503 inclusive.

15. The method of claim 14, wherein $\delta_m$ is in a range between 3 and 11 inclusive.

16. The method of claim 13, wherein the minimum conflict probability $P_{min}$ is less than or equal to about 20%.

17. A computer-readable storage medium having computer-executable instructions stored thereon that are executable by a computing device to perform operations for allocating Cell Identities (CELL-IDs) to cells in a radio communication network, the operations comprising:

assigning a first Cell Identity $(CELL\text{-}ID)_i$ to a first cell i in a radio communication network;

determining, for each element of an aggregate $\delta_n$, a sum of conflict probability in a common search space of the first cell i and in a common search space of one or more adjacent cells k that are adjacent to the first cell i, to generate a plurality of conflict probability values $P_1, \ldots, P_n$;

identifying a minimum conflict probability value $P_{min}$ from the plurality of conflict probability values $P_1, \ldots, P_n$, wherein $P_{min}$ corresponds to an element $\delta_m$ of the aggregate $\delta_n$; and assigning a second Cell Identity $(CELL\text{-}ID)_j$ to a particular adjacent cell j selected from the one or more adjacent cells k such that an absolute value of $(CELL\ ID)_i - (CELL\text{-}ID)_j$ equals $\delta_m$.

18. The computer-readable storage medium of claim 17, wherein $\delta_m$ is in a range between 0 and 503 inclusive.

19. The computer-readable storage medium of claim 18, wherein $\delta_m$ is in a range between 3 and 11 inclusive.

20. The computer-readable storage medium of claim 17, wherein the minimum conflict probability $P_{min}$ is less than or equal to about 20%.

* * * * *

UNITED STATES PATENT AND TRADEMARK OFFICE
CERTIFICATE OF CORRECTION

PATENT NO. : 8,675,598 B2  
APPLICATION NO. : 13/322285  
DATED : March 18, 2014  
INVENTOR(S) : Huang Page 1 of 1

It is certified that error appears in the above-identified patent and that said Letters Patent is hereby corrected as shown below:

In the Specification:

In Column 1, Line 60, delete "ID)$_i$-(CELL ID)$_j$" and insert -- ID)$_i$-(CELL-ID)$_j$ --, therefor.

In Column 2, Line 6, delete "element of" and insert -- element $\delta_m$ of --, therefor.

In Column 2, Line 8, delete "a particular" and insert -- to a particular --, therefor.

In Column 3, Line 9, delete "hereof" and insert -- hereof. --, therefor.

In Column 4, Line 13, delete "thereof" and insert -- thereof. --, therefor.

In Column 5, Line 25, delete "110C," and insert -- 110C. --, therefor.

In Column 8, Line 21, delete "(HACK)," and insert -- (NACK), --, therefor.

In Column 11, Line 14, delete "3GFP," and insert -- 3GPP, --, therefor.

In Column 13, Line 12, delete "(CELL ID)$_i$" and insert -- (CELL-ID)$_i$ --, therefor.

In Column 13, Line 45, delete "(CELL-ID))$_j$" and insert -- (CELL-ID)$_j$ --, therefor.

In Column 13, Line 53, delete "P((L$_{COMM-PDCCH}$)$_i$" and insert -- P((L$_{Comm-PDCCH}$)$_i$ --, therefor.

In Column 13, Line 56, delete "P((L$_{COMM-PDCCH}$)$_i$=" and insert -- P((L$_{Comm-PDCCH}$)$_i$= --, therefor.

In Column 14, Line 58, delete "$\delta_n$ Of The" and insert -- $\delta_m$ Of The --, therefor.

In the Claims:

In Column 17, Line 64, in Claim 7, delete "(CELL-ID))$_j$" and insert -- (CELL-ID)$_j$ --, therefor.

In Column 19, Line 18, in Claim 17, delete "(CELL ID)$_i$-" and insert -- (CELL-ID)$_i$- --, therefor.

Signed and Sealed this  
Sixteenth Day of September, 2014

Michelle K. Lee  
*Deputy Director of the United States Patent and Trademark Office*